US012632345B2

(12) United States Patent
Khobragade et al.

(10) Patent No.: US 12,632,345 B2
(45) Date of Patent: May 19, 2026

(54) PRIORITIZATION IN CLOUD MIGRATION FOR DEDUPLICATION SYSTEMS

(71) Applicant: Dell Products L.P., Round Rock, TX (US)

(72) Inventors: Shashank Prakash Khobragade, Maharashtra (IN); Santi Gopal Mondal, Bangalore (IN); Arun Vishnu Pk, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 93 days.

(21) Appl. No.: 18/084,722

(22) Filed: Dec. 20, 2022

(65) Prior Publication Data

US 2024/0202080 A1 Jun. 20, 2024

(51) Int. Cl.
G06F 11/00 (2006.01)
G06F 11/1446 (2026.01)

(52) U.S. Cl.
CPC ...... G06F 11/1464 (2013.01); G06F 11/1451 (2013.01); G06F 11/1466 (2013.01)

(58) Field of Classification Search
CPC ............. G06F 11/1464; G06F 11/1451; G06F 11/1466
See application file for complete search history.

(56) References Cited

U.S. PATENT DOCUMENTS

| | | | | |
|---|---|---|---|---|
| 9,298,561 B1 * | 3/2016 | Sawhney | ............ | G06F 11/1453 |
| 10,146,436 B1 * | 12/2018 | Natanzon | ............. | G06F 3/0608 |
| 10,162,528 B2 * | 12/2018 | Sancheti | ............... | G06F 16/183 |
| 10,831,610 B2 * | 11/2020 | Singhal | ............... | G06F 11/1466 |
| 11,265,288 B2 * | 3/2022 | Branch | ............... | H04L 61/2514 |
| 11,301,439 B2 * | 4/2022 | Athey | ................... | G06F 16/285 |
| 11,546,415 B2 * | 1/2023 | Krishnamoorthy | .... | G06N 20/10 |
| 11,983,075 B2 * | 5/2024 | Bhagi | ................... | G06F 16/168 |
| 12,141,034 B2 * | 11/2024 | Acharya | ............. | G06F 11/1451 |
| 2021/0103399 A1 * | 4/2021 | Lyu | ........................ | G06F 3/0673 |
| 2021/0109818 A1 * | 4/2021 | Perneti | .................. | G06F 11/324 |
| 2021/0132829 A1 * | 5/2021 | Zhao | ..................... | G06F 3/0631 |
| 2021/0303202 A1 * | 9/2021 | Ben Zeev | ............. | G06F 3/0605 |
| 2022/0078036 A1 * | 3/2022 | Cropper | .............. | H04L 12/1428 |
| 2022/0091738 A1 * | 3/2022 | Patil | ........................ | G06F 3/061 |
| 2022/0197758 A1 * | 6/2022 | Liao | ........................ | G06F 3/064 |
| 2022/0206903 A1 * | 6/2022 | Mehta | ................. | G06F 11/1464 |
| 2022/0229957 A1 * | 7/2022 | Venugopal | ................ | G06F 8/70 |

(Continued)

*Primary Examiner* — Loan L.T. Truong
(74) *Attorney, Agent, or Firm* — Dergosits & Noah LLP; Todd A. Noah

(57) ABSTRACT

Prioritization in cloud migration for deduplication systems is described. A system creates a set of priorities corresponding to backup files in a set of backup files, wherein each priority is based on estimating a time required for a corresponding backup file to migrate from a local storage system to a cloud storage system, and/or an amount of data deduplicated when the corresponding backup file is stored. The system copies a backup file, which corresponds to the highest priority in the set of priorities, from the set of backup files stored in the local storage system to a cloud storage system. Completing the copying of the set of backup files to the cloud storage system, the system copies a backup file, which corresponds to the lowest priority in the set of priorities, from the set of backup files stored in the local storage system to a cloud storage system.

20 Claims, 9 Drawing Sheets

(56)        References Cited

U.S. PATENT DOCUMENTS

| 2022/0237016 A1* | 7/2022 | Kamiya ................ G06F 9/5038 |
| 2023/0109513 A1* | 4/2023 | Misra ..................... H04L 67/34 |
| | | 709/220 |
| 2023/0393775 A1* | 12/2023 | Wu ....................... G06F 3/0617 |
| 2024/0095132 A1* | 3/2024 | Thondapilly Balakrishnan .......... |
| | | G06F 11/1469 |
| 2024/0095391 A1* | 3/2024 | Gordon .............. G06F 21/6227 |
| 2024/0111631 A1* | 4/2024 | Ezrielev ............. G06F 11/1451 |
| 2024/0248812 A1* | 7/2024 | Minarik ............... G06F 16/285 |
| 2025/0094193 A1* | 3/2025 | Harada .................... G06F 9/50 |

* cited by examiner

600

| file attribute 3 | average parameter value |
|---|---|

| file attribute 2 | average parameter value |
|---|---|

| file attribute 1 File Size 602 | average parameter value 1 Average Migration Time 604 |
|---|---|
| <3.49 GB | 4.87 minutes |
| 3.5 - 4.49 GB | 6.50 minutes |
| 4.5 - 5.49 GB | 8.12 minutes |
| ... | ... |

...

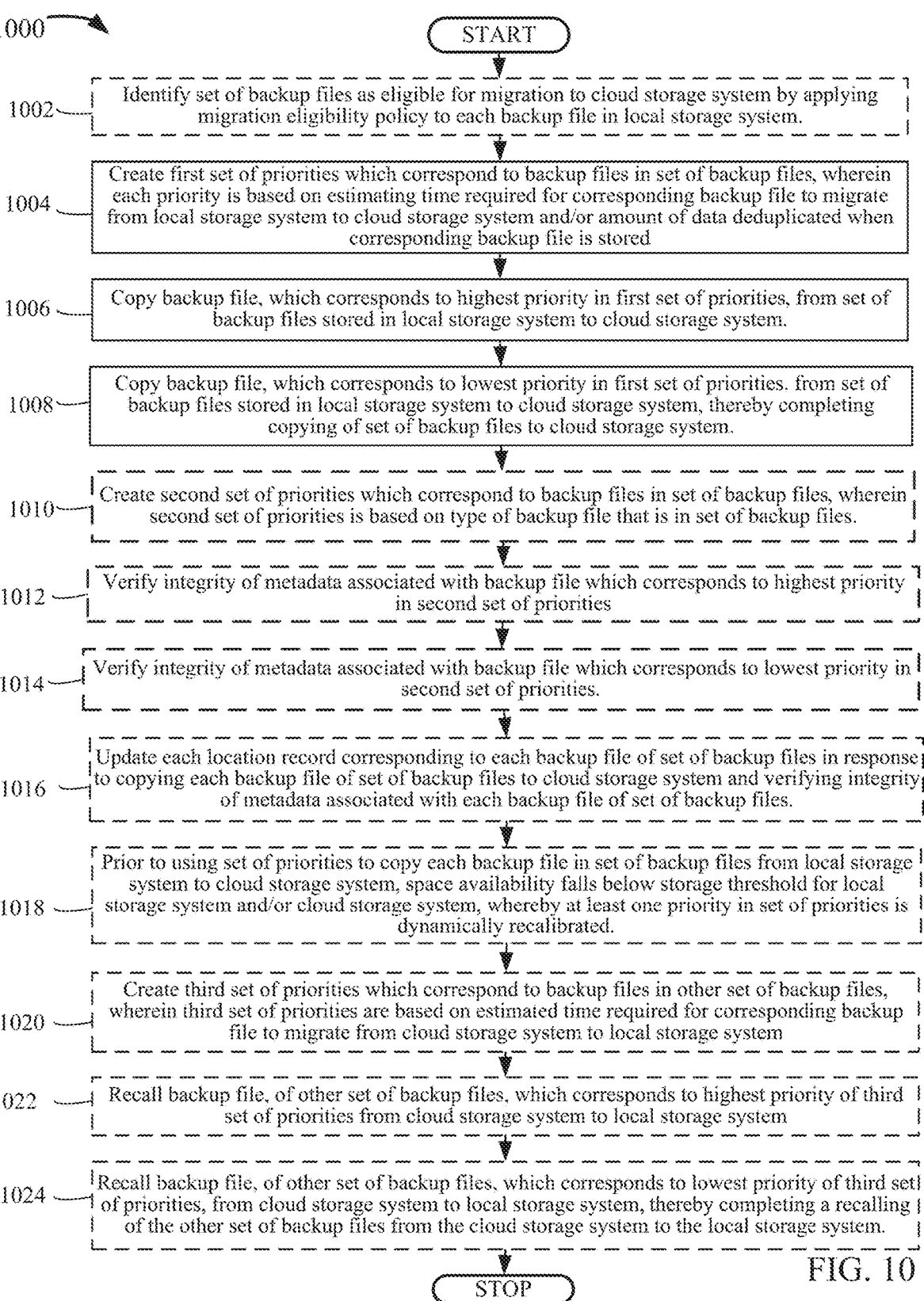

1000

START

1002 — Identify set of backup files as eligible for migration to cloud storage system by applying migration eligibility policy to each backup file in local storage system.

1004 — Create first set of priorities which correspond to backup files in set of backup files, wherein each priority is based on estimating time required for corresponding backup file to migrate from local storage system to cloud storage system and/or amount of data deduplicated when corresponding backup file is stored 1006 — Copy backup file, which corresponds to highest priority in first set of priorities, from set of backup files stored in local storage system to cloud storage system.

1008 — Copy backup file, which corresponds to lowest priority in first set of priorities, from set of backup files stored in local storage system to cloud storage system, thereby completing copying of set of backup files to cloud storage system.

1010 — Create second set of priorities which correspond to backup files in set of backup files, wherein second set of priorities is based on type of backup file that is in set of backup files.

1012 — Verify integrity of metadata associated with backup file which corresponds to highest priority in second set of priorities 1014 — Verify integrity of metadata associated with backup file which corresponds to lowest priority in second set of priorities.

1016 — Update each location record corresponding to each backup file of set of backup files in response to copying each backup file of set of backup files to cloud storage system and verifying integrity of metadata associated with each backup file of set of backup files.

1018 — Prior to using set of priorities to copy each backup file in set of backup files from local storage system to cloud storage system, space availability falls below storage threshold for local storage system and/or cloud storage system, whereby at least one priority in set of priorities is dynamically recalibrated.

1020 — Create third set of priorities which correspond to backup files in other set of backup files, wherein third set of priorities are based on estimated time required for corresponding backup file to migrate from cloud storage system to local storage system 1022 — Recall backup file, of other set of backup files, which corresponds to highest priority of third set of priorities from cloud storage system to local storage system 1024 — Recall backup file, of other set of backup files, which corresponds to lowest priority of third set of priorities, from cloud storage system to local storage system, thereby completing a recalling of the other set of backup files from the cloud storage system to the local storage system.

STOP

FIG. 10

PRIORITIZATION IN CLOUD MIGRATION FOR DEDUPLICATION SYSTEMS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application performs a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to perform a restore operation to restore a copy of the corresponding backup file(s) for that previous state to the data object.

A data object and/or a backup file may be stored on a cloud storage system, which is a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computer service, a web service application programming interface (API), or by applications that utilize a web service API, such as cloud desktop storage, a cloud storage gateway, or Web-based content management systems.

Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data backup file attachment, a data storage system could store all 100 instances of the same 1 MB data backup file attachment, inefficiently using 100 MB of storage space to store the same 1 MB data backup file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data backup file attachment and stores small references to the one stored instance for the 99 subsequent instances.

A secondary storage data-protection system can extend the advantages of deduplication when using a cloud storage system as an ideal choice for long term retention. Such a system's migration of backup data to a cloud storage system is cost effective, ideal for long term retention, and safe from local disasters. This migration may be logical, when the system migrates each eligible backup file on an individual basis to a cloud storage system, or physical, when the system migrates bulk data from eligible backup files. Systems which implement migrations at the logical backup file level can use an eligibility policy to identify backup files that are eligible for migration to a cloud storage system. Some of the common policies are based on age, such as when all the eligible backup files are older than a specified threshold, based on an age-range, such as when each of the eligible backup files are an age that is within a given range, and/or managed by an application, such as when a backup/restore application marks backup files individually as eligible for migration, which in-turn could be based on the ages of the backup files.

For example, FIG. 1 depicts that a typical cloud migration workflow uses a namespace iterator 102 that applies such an eligibility policy to identify backup files 104A which are eligible for migration, and therefore enqueues copies of these backup files 104B into a copy queue 106 in a copy sub-system 108. Next, one of the copy threads 110 in the copy sub-system 108 retrieves a copy 112A of one of the backup files 104B, stores a copy 112B of the backup file to a cloud tier storage system 114, and enqueues a metadata verify job 116 for the copy 112B of the backup file into a verify queue 118 in a verify sub-system 120. Then one of the verify threads 122 in the verify sub-system 120 executes the metadata verify job 116 to verify the metadata integrity of the copy 112B of the backup file and initiates a namespace update, which updates the location of the copy 112C of the backup file as the cloud tier storage system 114. However, prioritizing the backup files which are being migrated to and deduplicated on the cloud tier storage system 114 does not reduce the migration's total run time. Therefore, secondary storage systems do not enable any priority order or offer any way for an end-user, a backup and restore application, or a backup client to specify a priority for migrating backup files.

BRIEF DESCRIPTION OF THE DRAWINGS

FIG. 10 is a flowchart that illustrates a method of prioritization in cloud migration for deduplication systems, under an embodiment.

DETAILED DESCRIPTION

Without any priority order, preferences, or requirements, secondary storage systems migrate backup files to a cloud tier storage system in the order that the backup files were identified as eligible for migration to the cloud storage system during namespace enumeration. Due to such a system lacking any prioritization mechanism, an end-user's preferences or requirements to prioritize certain workloads, out of all the data that is eligible for migration, is not satisfied.

Figure 1:
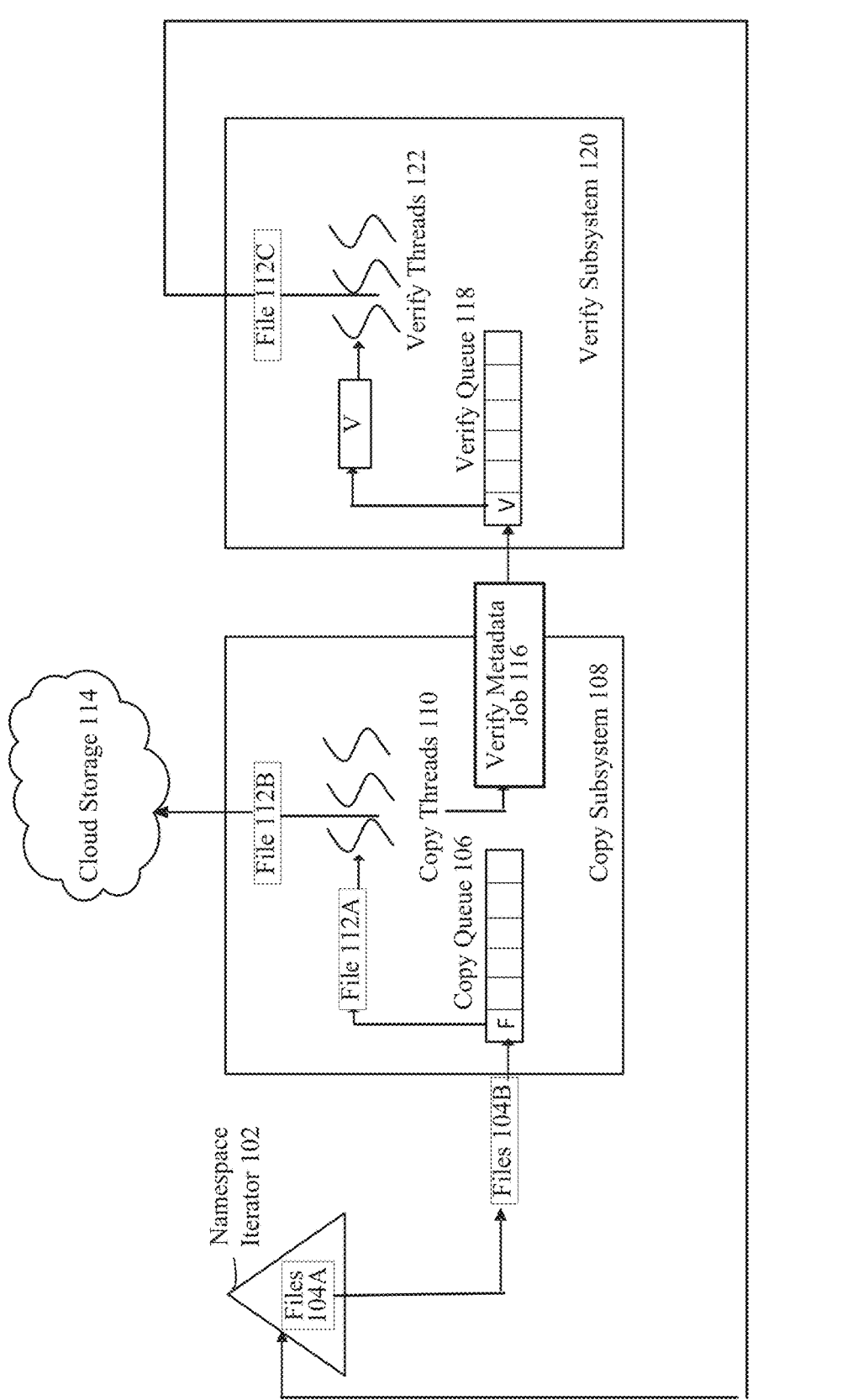
FIG. 1 illustrates a block diagram of an example prior art cloud migration workflow.

As described above and depicted by FIG. 1, backup file migration in secondary storage data-protection systems which provide data-invulnerability require three phases: copy to a cloud tier storage system, metadata verification, and namespace update. When most of the backup files which are eligible for a backup file migration run to a cloud storage system are relatively large backup files, a backup file migration run may spend a relatively long time to complete the three phases of migration before an end-user can observe that most of the backup files have completed the three phases of migration because both the time spent on the copy phase for any backup file and the time spent on the verify phase completion for the backup file are directly proportional to the size of the backup file being migrated. These skewed observations of the completion of backup file migrations can give an end-user a faulty impression of slowness during a backup file's migration run.

Figures 2, 3:
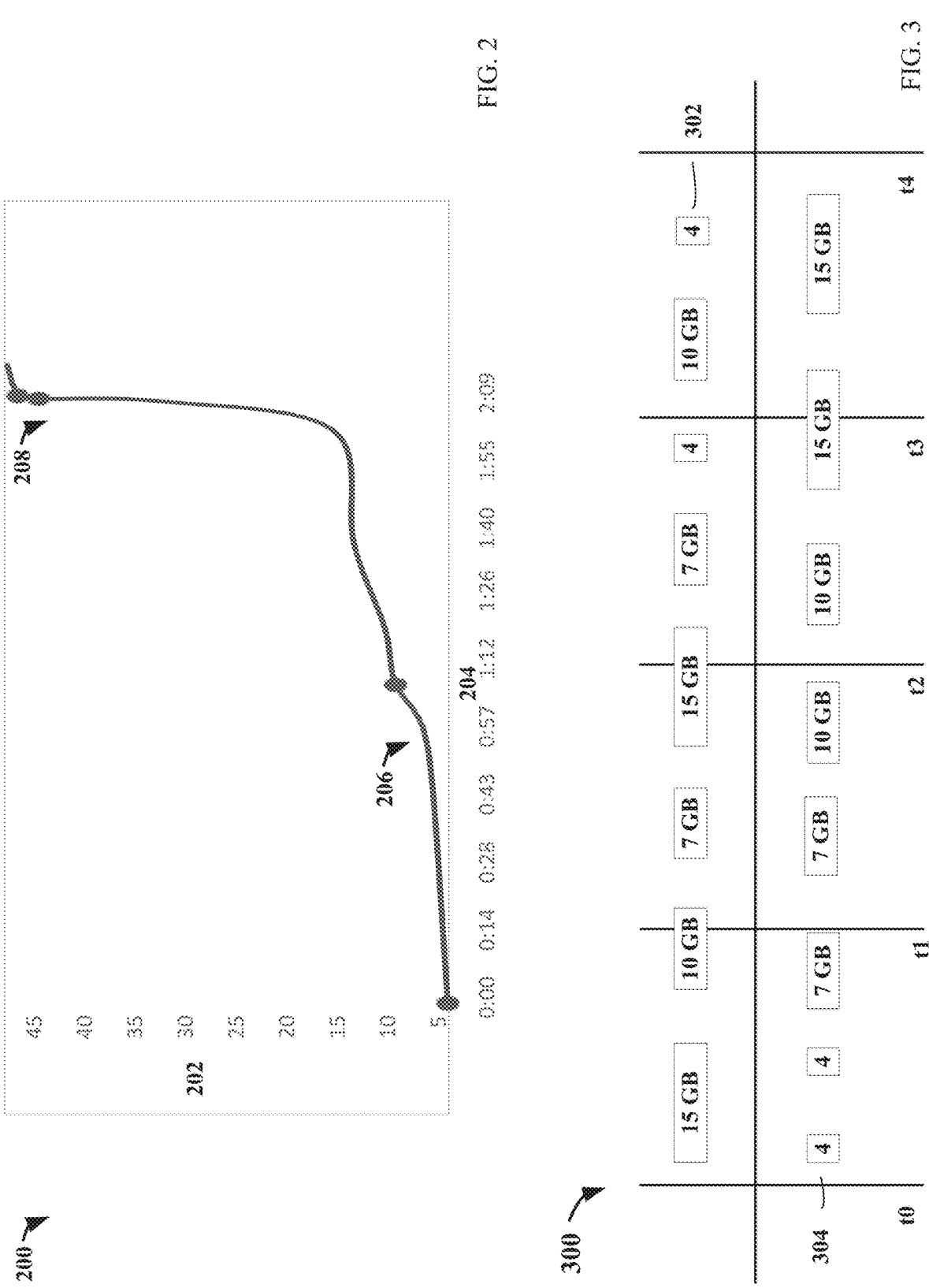
FIG. 2 illustrates a block diagram of an example of a negatively skewed completion distribution for a prior art backup file migration.
FIG. 3 illustrates a block diagram of an example prioritization of backup files based on estimated migration time, for prioritization in cloud migration for deduplication systems, under an embodiment.

FIG. 2 illustrates a block diagram of an example negatively skewed backup file migration completion distribution 200. The vertical axis 202 indicates the number of backup files migrated while the horizontal axis 204 indicates time periods for backup file migrations. The backup file migration completion distribution 200 indicates that approximately five backup files completed migration to a cloud storage system in approximately the first hour 206 of migration and approximately forty-five backup files completed migration to the cloud storage system in approximately the first two hours 208 of migration.

Although a secondary storage system prioritizing the backup files which may be migrated to a cloud storage system typically has no effect on the total migration run time, by prioritizing the backup files within a migration run, the system can improve an end-user's experience. A secondary storage data protection system that includes a migration sub-system with priority modules can resolve the problems of end users observing a negatively skewed backup file's migration completion, by generating a heuristics-based priority order, based on heuristically estimated migration times, to order the migration of backup files with relatively low estimated migration times before the migration of other backup files, thus shortening the left tail of the negatively skewed backup file migration completion distribution, if not eliminating the left tail. Heuristics are the strategies derived from previous experiences with similar problems. These strategies depend on using readily accessible, though loosely applicable, information to control problem-solving.

FIG. 3 illustrates a block diagram 300 of an example prioritization of backup files based on estimated migration time, for prioritization of cloud migration for deduplication systems, under an embodiment. The block diagram 300 indicates the order of backup files migrating to a cloud tier storage system, during four time periods, with the first migration order 302 depicting backup files migrating to the cloud tier storage system in an order without prioritization. The second migration order 304 depicts backup files migrating to a cloud tier storage system in a prioritized order which the migration sub-system with priority modules based on estimated migration times, with the smaller backup files migrating before the larger backup files because smaller backup files spend less time migrating than the time spent by larger backup files to migrate. Consequently, executing the first migration order 302 without prioritization would result in less than two backup files completing migration by the end of the first time period, which includes a 15 gigabyte (GB) backup file that completed migration and a 10 GB backup file that partially completed migration. In contrast, executing the second migration order 304 with prioritization results in three backup files completing migration by the end of the first time period, a 4 GB backup file, another 4 GB backup file, and a 7 GB backup file, each of which completed migration.

Embodiments herein enable prioritization in cloud migration for deduplication systems. A system creates a set of priorities which corresponds to the backup files in a set of backup files, wherein each priority is based on estimating the time spent for a corresponding backup file to migrate from a local storage system to a cloud storage system or an amount of data that is deduplicated when the corresponding backup file is stored. The system copies a backup file, which corresponds to the highest priority in the set of priorities, from the third file's set of backup files stored in the local storage system to a cloud storage system. To complete the copying of the set of backup files to the cloud storage system, the system copies a backup file, which corresponds to the lowest priority in the set of priorities, from the set of backup files stored in the local storage system to a cloud storage system.

For example, a system creates a set of copying priorities corresponding to files in the set of backup files in a set of customer relationship management (CRM) records' backup files that were created more than a month ago, wherein the copying priorities are based on estimating the time spent by a corresponding CRM record's backup file to migrate from the active tier local storage system to the cloud tier storage system and/or the amount of data deduplicated when the corresponding CRM record's backup file is stored. The system copies the CRM backup file that stores 8 GB of data, including 2 GB of data that was previously deduplicated, and that currently has the highest copying priority of 1.92 among the set of CRM backup files, to the cloud tier storage system. The system also copies the CRM backup file that stores 13 GB of data, including 12 GB of data that was deduplicated, and that currently has the lowest copying priority of 1.18 among the set of CRM backup files, to the cloud tier storage system, thereby completing the copying of the set of CRM backup files to the cloud tier storage system.

Secondary storage systems which migrate backup files to cloud tier storage system for long term retention will also migrate data to a cloud tier storage system in-time to maintain space availability on the active tier local storage system. A garbage collector can reclaim space that stored backup files which migrated from an active tier local storage system to cloud tier storage system recently, but only if these backup files have completed all three phases of migration—copying the backup files, verifying the backup files' metadata integrity, and updating the backup files' location information in namespace. In a situation when an active tier local storage system is running out of storage space, an end-user's priority is to free up storage space on the active tier local storage system as soon as possible.

In the absence of priority order, backup files are selected for migration to cloud tier storage system in an order that is based on namespace enumeration. If backup files that store relatively high amounts of data which is deduplicated in the active tier local storage system are selected for migration to cloud tier storage system, then data corresponding to these backup files may still be live and referenced by other backup files, even after a relatively high amount of migration time. Consequently, these backup files with relatively high amounts of data that is deduplicated in the active tier local storage system active tier local storage system may still be ineligible for cleaning.

Figures 4, 5:
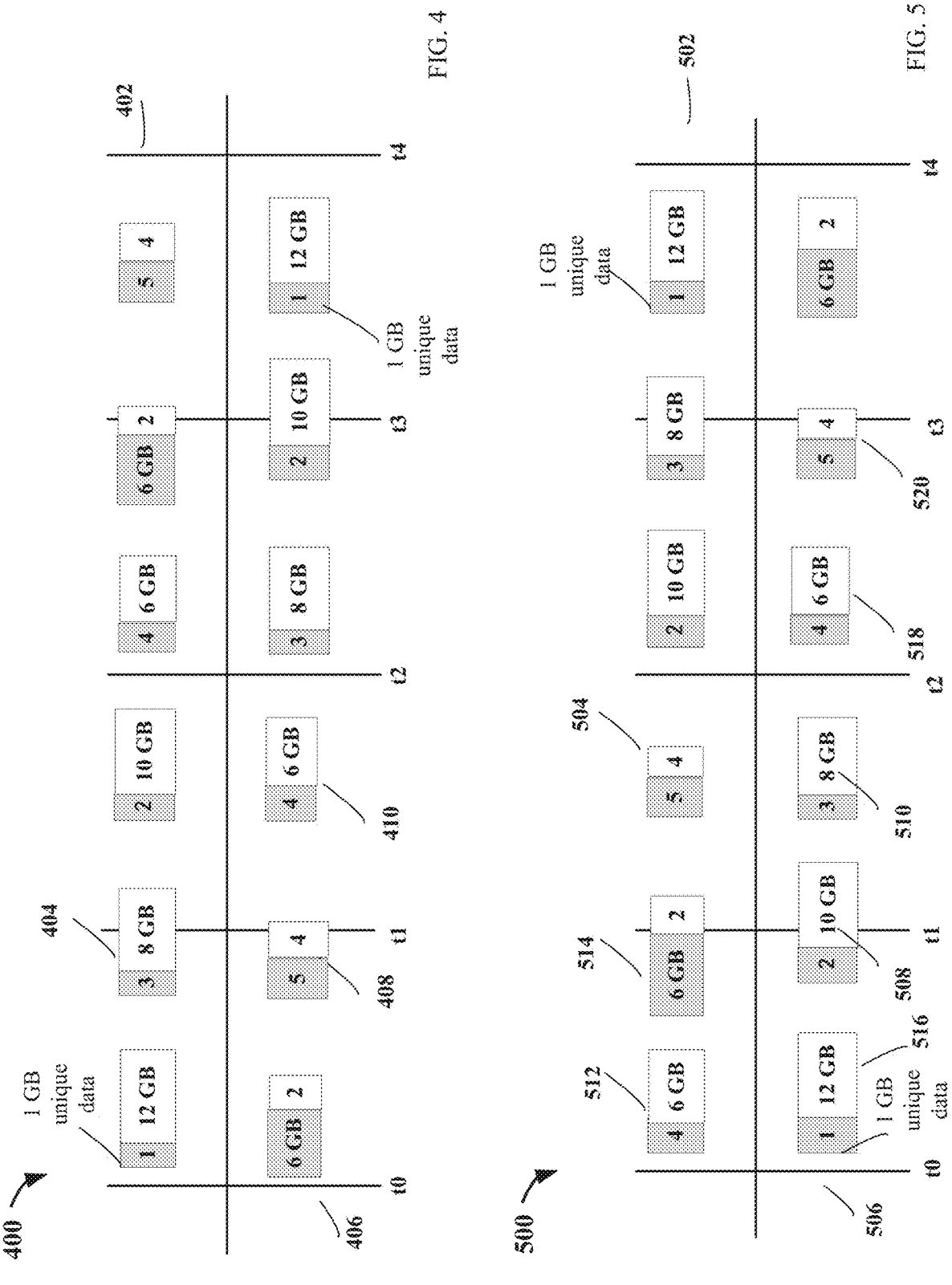
FIG. 4 illustrates a block diagram of an example prioritization of backup files based on amounts of data deduplicated in an active tier local storage system, for prioritization in cloud migration for deduplication systems, under an embodiment.
FIG. 5 illustrates a block diagram of an example prioritization of backup files based on amounts of data deduplicated in a cloud tier storage system, for prioritization in cloud migration for deduplication systems, under an embodiment.

FIG. 4 illustrates a block diagram 400 of an example prioritization of backup files based on amounts of data deduplicated in active tier storage system, for prioritization in cloud migration for deduplication systems, under an embodiment. The block diagram 400 indicates the order of backup files migrating to cloud tier storage system during four time periods, with the first migration order 402 depicting backup files migrating in a random order without prioritization. Each of the backup files stores an amount of unique data, which is depicted by the dark/shaded left section of each block that represents a backup file, such as the second backup file 404 in the first migration order 402 which stores 3 GB of unique data. Each of the backup files also stores an amount of data that is deduplicated, which is depicted by the light/unshaded right section of each block that represents a backup file, such as the second backup file 404 in the first migration order 402 which stores 8 GB of data that is deduplicated on the active tier local storage system.

The second migration order 406 depicts backup files migrating in a prioritized order which the migration sub-system, with priority modules based on estimated amounts of data that are stored and estimated amounts of data that is deduplicated in each backup file. For example, the priority for the second backup file 408 in the second migration order 406 to be migrated to a cloud tier storage system is higher than the priority for the third backup file 410 in the second migration order 406 to be migrated to the cloud tier storage system because the second backup file 408 is estimated to store 9 GB of data which includes 4 GB of data that is deduplicated in the active tier local storage system, which is a relatively low amount of deduplicated data when compared to the third backup file 410 which is estimated to store 10 GB of data, which includes 6 GB of data that is deduplicated in the active tier local storage system, and the third backup file 410 which is estimated to store 10 GB of data, which includes 6 GB of data that is deduplicated in the active tier local storage system. A priority module estimated the second backup file 408 to store 4 GB of data that is deduplicated in the active tier local storage system, because the heuristics and priority module estimated the second backup file 408 to store 4 GB of data that is deduplicated in the active tier local storage system, because the heuristics recorded that the most recent time that the second backup file 408 was stored on the active tier local storage system, the second backup file 408 stored 4 GB of data that was deduplicated in the active tier local storage system. Alternatively, the heuristics recorded that the three most recent instances that the second backup file 408 was stored on the active tier local storage system, the second backup file 408 stored an average of 4 GB of data that was deduplicated in the active tier local storage system.

Similarly, a priority module estimated that the third backup file 410 stores 10 GB of data which includes 6 GB of data that is deduplicated in the active tier local storage system, because the heuristics recorded that the most recent instance that the third backup file 410 was stored on the active tier local storage system, the third backup file 410 stored 10 GB of data which includes 6 GB of data that was deduplicated in the active tier local storage system. Alternatively, the heuristics recorded that the three most recent instances that the third backup file 410 was stored on the active tier local storage system, the third backup file 410 stored an average of 10 GB of data and 6 GB of data that was deduplicated in the active tier local storage system.

Since backup files that store relatively low amounts of data that is deduplicated in the active tier local storage system are generally referenced by relatively low numbers of other backup files, these backup files with relatively low amounts of data that are deduplicated in the active tier local storage system will become eligible for cleaning in a relatively low amount of time. In contrast, since backup files that store relatively high amounts of data that is deduplicated in the active tier local storage system is generally referenced by relatively high numbers of other backup files, these backup files with relatively high amounts of data that is deduplicated in the active tier local storage system will become eligible for cleaning in a relatively high amount of time. Consequently, the first migration order 402 results in the first three backup files which will be migrated to cloud tier storage system during the first two time periods as storing relatively high amounts of deduplicated data which are referenced by relatively high numbers of other backup files and therefore will require a relatively high amount of time to become eligible for cleaning and space reclamation. In contrast, the second migration order 406 results in the first three backup files which will be migrated to cloud tier storage system during the first two time periods as storing relatively low amounts of deduplicated data which are referenced by relatively low numbers of other backup files and therefore will require a relatively low amount of time to become eligible for cleaning and space reclamation.

Additionally, the backup files that store relatively low amounts of data that is deduplicated in the active tier local storage system are backup files that generally store relatively high amounts of unique data, such that the relatively high priorities for migrating these backup files results in relatively high amounts of unique data stored in relatively high amounts of space that becomes eligible for reclamation. Therefore, the priority modules create custom priority orders for the migration sub-system based on heuristics and assign relatively high migration priorities to backup files with relatively low amounts of migration time and relatively low amounts of data that is deduplicated in the active tier local storage system. These relatively small backup files migrate more quickly, become eligible for cleaning more quickly because they are referenced by relatively low numbers of other backup files, and store relatively high amounts of unique data in the active tier local storage system, thereby making relatively high amounts of space eligible for reclamation in relatively low amounts of time. Therefore, the migration sub-system with priority modules enables faster space reclamation on an active tier local storage system.

When the amount of available space in a cloud tier storage system is nearly exhausted, a secondary storage deduplication system which lacks any prioritization mechanism may copy backup files which deduplicate poorly on the cloud tier storage system before sending backup files which deduplicate well on the cloud tier storage system. Backup files that deduplicate poorly are reduced in size by only a relatively low amount of deduplicated data, thereby resulting in these backup files continuing to store relatively high amounts of their data as unique data. Consequently, these backup files remain relatively large backup files that occupy relatively high amounts of storage space on the nearly exhausted available space in the cloud tier storage system, thereby enabling only a relatively low number of these backup files to migrate to the cloud tier storage system.

In contrast, when the amount of available space in a cloud tier storage system is nearly exhausted, the migration sub-system and the priority modules can prioritize migration for backup files which would deduplicate well on the cloud tier storage system, thereby resulting in relatively high numbers of backup files stored in relatively low amounts of storage space, thus optimally using the cloud tier storage's nearly exhausted space. FIG. 5 illustrates a block diagram 500 of an example prioritization of backup files based on relative amounts of data that are estimated to be deduplicated in a cloud tier storage system, for prioritization in cloud migration for deduplication systems, under an embodiment. The priority modules generate priorities for migrating backup files to cloud tier storage system by using heuristics to estimate the amounts of data that would be deduplicated on the cloud tier storage system.

The block diagram 500 depicts the order of backup files migrating to cloud tier storage system during four time periods, with the first migration order 502 illustrating backup files migrating in a random order without prioritization. Each of the backup files stores an estimated amount of unique data, which is depicted by the dark/shaded left section of a block that represents a backup file, such as the third backup file 504, in the first migration order 502, which stores 5 GB of unique data. Each of the backup files also stores an amount of data which is estimated to be deduplicated on a cloud tier storage system, which is depicted by the light/unshaded right section of each block that represents a backup file, such as the third backup file 504, in the first migration order 502, which stores 4 GB of data that is estimated to become deduplicated on a cloud tier storage system. A priority module estimated the third backup file 504 to store 5 GB of unique data and 4 GB of data that will deduplicated in the cloud tier storage system, because the heuristics recorded that the most recent instance that the third backup file 504 was stored on the active tier local storage system, the third backup file 504 stored 5 GB of unique data and 4 GB of data that was deduplicated in the active tier local storage system. Alternatively, the heuristics recorded that the three most recent instances that the third backup file 504 was stored on the active tier local storage system, the third backup file 504 stored an average of 5 GB of unique data and 4 GB of data that was deduplicated in the active tier local storage system.

The second migration order 506 depicts backup files migrating in a prioritized order which the migration sub-system with priority modules based on estimated amounts of data that will be deduplicated in each backup file. For example, the priority for the second backup file 508 in the second migration order 506 to be migrated to a cloud tier storage system is higher than the priority for the third backup file 510 in the second migration order 506 to be migrated to the cloud tier storage system because the second backup file 508 is estimated to store 10 GB of data that will be deduplicated in the cloud tier storage system, which is a relatively high amount of deduplicated data when compared to the third backup file 510 which is estimated to store 8 GB of data that will be deduplicated in the cloud tier storage system.

Migrating backup files based on the second migration order 506 results in the backup files that are estimated to store relatively high amounts of deduplicated data on a cloud tier storage system migrating to cloud tier storage system before the backup files that are estimated to store relatively low amounts of deduplicated data on the cloud tier storage system will migrate to the cloud tier storage system. Consequently, the first migration order 502 results in migrating the first three backup files to a cloud tier storage system during the first two time periods, and applying relatively low amounts of deduplication to the cloud tier storage system for the three backup files, thereby reducing the sizes of the three backup files by relatively small amounts of data. These three backup files store 15 GB of unique data (4 GB of unique data for the first backup file 512 plus 6 GB of unique data for the second backup file 514 plus 5 GB of unique data for the third backup file 504) in the cloud tier storage system's diminishing space.

In contrast, the second migration order 506 results in migrating the first three backup files to a cloud tier storage system during the first two time periods, and applying relatively high amounts of deduplication on the cloud tier storage system to the three backup files, thereby reducing the sizes of the three backup files by relatively high amounts of data. These three backup files store 6 GB of unique data (1 GB of unique data for the first backup file 516 plus 2 GB of unique data for the second backup file 508 plus 3 GB of unique data for the third backup file 510) in the cloud tier storage system's nearly exhausted space, which is a reduction of occupied storage space by 9 GB relative to the reduction by the first migration order 502. Therefore, the migration sub-system and priority modules enable the storage of 4 additional GB of unique data by the fourth backup file 518 in the second migration order 506 and an additional 5 GB of storage space still available, for the fifth backup file 520 which coincidentally stores 5 GB of unique data, thereby aggregating to 9 more GB of backup file data stored by 2 additional backup files.

Therefore, the priority modules create custom priority orders based on heuristics that prioritize backup files with estimated relatively low amounts of migration time and estimated relatively high amounts of data deduplication in the cloud tier storage system. The relatively small backup files migrate more quickly and are stored in relatively low amounts of storage, because their relatively high amounts of deduplication result in reducing the sizes of the backup files by relatively high amounts of storage space, thereby retaining relatively high amounts of available space for backup files that are eligible for storing relatively high numbers of backup files. Consequently, the migration sub-system with priority modules enables optimal space utilization on cloud tier storage system.

An end-user may have a requirement to prioritize the migration of a specific type of backup file of all backup files that are eligible for migration to cloud tier storage system. In the absence of any priority order, the migration sub-system enables a manual version of prioritized migration by marking a set of backup files for migration via a backup application, and then repeating this process, each time selecting a subset of backup files for migration in a desired priority order. This migration sub-system could maintain a list of all backup files which are eligible for migration to cloud tier storage system, and then repeat the marking and the migrating of these backup files, which is an inefficient process. Instead, the priority modules provide each end-user with the opportunity and the flexibility to create custom priority orders based on size, type, or even explicit marking of individual backup files for a relatively high priority for migration to cloud tier storage system.

The priority modules can define priority orders based on parameters specifically identified for estimating deduplication based on secondary storage systems. The priority modules use parameters, which are based on heuristic estimations and backup file attributes, to calculate the priority values of migration-eligible backup files. For estimations, the priority modules maintain heuristic matrices or tables, and map backup file attributes to the average values of any parameters to be estimated. The priority modules can then use the average value of a parameter to estimate the parameter's value for a given backup file while determining the backup file's priority value.

A priority module calculates the priority value of a backup file by means of a function which is based on end-user requirements and/or system requirements. A priority module can assign weights to parameters which in-turn are based on the requirement(s) for a priority value. The migration sub-system then uses the calculated priority value while enqueuing a backup file in a migration sub-system queue, thereby effectively making such queues function as priority queues.

In order to estimate parameter values such as migration time or data deduplication on active tier local storage system and/or a cloud tier storage system, while defining a priority value for a backup file, a migration sub-system can use the creation of a set of heuristic matrices or tables for backup file attributes per the parameter value to be estimated. Each matrix stores a set of key-value pairs, which map backup file attributes to the average values of the parameter to be estimated. The migration sub-system references such matrices to estimate the parameter values to be used to determine the priorities for each backup file in each set of backup files. After completing the migration for each backup file, the migration sub-system updates the average values corresponding to the backup file's attributes for each matrix.

$$H_p(f, a) = M(p, a, f)$$

where, $H_p(f, a)$—average value of parameter "p" for the given backup file "f" as per backup file attribute "a"

Figure 6:
FIG. 6 illustrates a block diagram of example heuristics matrices for prioritization in cloud migration for deduplication systems, under an embodiment.

M—3-dimensional matrix with heuristic statistics p—parameter a—backup file attribute f—backup file for which heuristics need to be fetched FIG. 6 illustrates a block diagram of example heuristics matrices 600 for prioritization in cloud migration for deduplication systems, under an embodiment. For example, in order to estimate migration time, the system creates a matrix that maps the backup files' File Size 602 to Average Migration Time 604. After each backup file migration is completed, the system updates the Average Migration Time 604 corresponding to the File Size 602 of the given backup file in the matrices 600. For each related estimation, this Average Migration Time 604 is then used in addition to other heuristics to estimate the future migration time of each specific backup file.

A heuristics-based estimation function for a particular parameter uses the heuristic function $H_p(f, a)$ to fetch the average value, as per the backup file and/or system attribute used as a key. Then the migration sub-system uses different backup file and system attributes together to determine the estimation for the required parameter for a given backup file.

$$E_p(f) = \sum_{i=0}^{n} W_i H_p(f, a_i)$$

where, $E_p(f)$—estimation of parameter p for backup file f n—total number of backup file attribute inputs for estimation $W_i$—estimation weight for it backup file attribute $H_p(f, a_i)$—average value of parameter "p" for the given backup file "f" as per $i_{th}$ backup file or system attribute "a"

The priority modules use priority functions to estimate values and backup file attributes to calculate the priority value for a backup file based on the requirement condition(s). The priority value is then mapped to a predetermined range so that the priority value can span across different priority orders as a backup file's priority order adapts based on system requirements. In order to prioritize backup files with relatively low migration time, the priority modules calculate priority as inversely proportional to the estimated migration times, which in turn are derived from heuristic values of backup file attributes, such as backup file size, locality of backup file data, eligibility for multi-streaming, and/or recipe-based optimization, and the amount of data deduplicated when a backup file was stored to the active tier local storage system.

$$P(f) \propto \frac{1}{E_m(f)}$$

In a simplified example, heuristic values of the backup file attribute of backup file size indicates that approximately 13 GB backup files have averaged 21.1-minute migrations, approximately 12 GB backup files have averaged 19.5-minute migrations, approximately 11 GB backup files have averaged 18.0-minute migrations, approximately 10 GB backup files have averaged 16.3-minute migrations, approximately 9 GB backup files have averaged 14.6-minute migrations, and approximately 8 GB backup files have averaged 13.0-minute migrations. Using these average values as the only parameter and the weight of 0.04 in the equations above applied to the backup files depicted in FIG. 4 and FIG. 5, the 8 GB backup file has a copying priority value of 1.92, the 9 GB backup file has a copying priority value of 1.71, the 10 GB backup file has a copying priority value of 1.53, the 11 GB backup file has a copying priority value of 1.39, the 12 GB backup file has a copying priority value of 1.28, and the 13 GB backup file has a copying priority value of 1.18. Since these copying priority values are calculated to prioritize only low migration times, and smaller backup files migrate faster than larger backup files, the smallest 8 GB backup file has the highest copying priority value of 1.92, while the largest 13 GB backup file has the lowest copying priority value of 1.18, thereby using copying priority values to create copying priorities for the set of backup files, with the 8 GB backup player assigned the highest copying priority and the 13 GB backup file assigned the lowest copying priority. Consequently, the system creates a set of priorities for a set of backup files by creating a priority value for each backup file, such as 1.92 for the 8 GB backup file and 1.18 for the 13 GB backup file, and then uses the priority values to create a priority for each backup file, such as the highest priority for the 8 GB backup file with the highest priority value of 1.92, and the lowest priority for the 13 GB backup file with the highest priority value of 1.18.

In order to prioritize backup files that have a relatively low migration time and a relatively low amount of data that is deduplicated in an active tier local storage system, so that more active tier local storage space may be reclaimed faster, the priority modules define priority of a backup file as inversely proportional to the amount of data deduplicated for the active tier local storage system and the estimated migration time. The estimated amount of deduplicated data and estimated migration time are derived from heuristic values of backup file attributes such as backup file size, locality of backup file data, eligibility for multi-streaming or recipe-based optimization, and the amount of data deduplicated when a backup file was stored to the active tier local storage system.

$$P(f) \propto \frac{1}{E_m(f) \Lambda d(f)}$$

Continuing with the example priority values calculated above for the backup files depicted in FIG. 4 and FIG. 5, and adding in their depicted amounts of deduplicated data on the active tier local storage system as an additional parameter, and weighted by a weight of $\frac{1}{16}$ GB to adjust this newly weighted parameter to the same scale as the previous weighted parameter, the new priority values are calculated to prioritize backup files with relatively low migration time and relatively low amounts of data that is deduplicated in active tier local storage system. The 8 GB backup file with 2 GB of deduplicated data has a new priority value of 15.38, the 9 GB backup file with 4 GB of deduplicated data has a new priority value of 6.84, the 10 GB backup file with 6 GB of deduplicated data has a new priority value of 4.08, the 11 GB backup file with 8 GB of deduplicated data has a new priority value of 2.78, the 12 GB backup file with 10 GB of deduplicated data has a new priority value of 2.05, and the 13 GB backup file with 12 GB of deduplicated data has a new priority value of 1.57. Since these priority values are calculated to prioritize low migration times and low amounts of data deduplicated on the active tier local storage system, and smaller backup files migrate faster than larger backup files, and smaller backup files tend to have smaller amounts of data that is deduplicated on the active tier local storage system, the 8 GB backup file with 2 GB of deduplicated data has the highest priority value of 15.38, while the 13 GB backup file with 12 GB of deduplicated data has the lowest priority value of 1.57.

The priority modules assign relatively high priority values to backup files with relatively low amounts of migration time and relatively high amounts of data deduplicated on the cloud tier storage system, so that the migration sub-system can migrate greater numbers of backup files to a nearly exhausted cloud tier storage system. Consequently, the priority modules define each copy priority value as directly proportional to the estimated amount of data that will be deduplicated on the cloud tier storage system and inversely proportional to the estimated amount of migration time. The priority modules derive both of these estimated amounts from heuristic statistics of backup file attributes such as backup file size, locality of backup file data, eligibility for multi-streaming or recipe-based optimization, and the amount of data deduplicated when a backup file was stored to the active tier local storage system.

$$P(f) \propto \frac{E_{cd}(f)}{E_m(f)}$$

Continuing with the example priority value calculated above for the backup files depicted in FIG. 4 and FIG. 5, and substituting in their depicted amounts of data to be deduplicated on the cloud tier storage system as an additional parameter, and weighted by a weight of 1.0. This weight of 1.0 enables this updated and weighted priority value to be calculated on a similar scale as the priority values calculated to prioritize backup files with relatively low migration time and relatively low amounts of data that is to be deduplicated in the cloud tier storage system. Therefore, the priority modules use the weighted priority parameter of 1.0 t calculate, the updated priority values which are used to prioritize backup files with relatively low migration time and relatively high amounts of data that is to be deduplicated in the cloud tier storage system. The 8 GB backup file with 2 GB of deduplicated data has an updated priority value of 3.84, the 9 GB backup file with 4 GB of deduplicated data has an updated priority value of 6.84, the 10 GB backup file with 6 GB of deduplicated data has an updated priority value of 9.18, the 11 GB backup file with 8 GB of deduplicated data has an updated priority value of 11.12, the 12 GB backup file with 10 GB of deduplicated data has an updated priority value of 12.80, and the 13 GB backup file with 12 GB of deduplicated data has an updated priority value of 14.16. Since these priority values are calculated to prioritize low migration times and high amounts of data to be deduplicated on the cloud tier storage system, and smaller backup files migrate faster than larger backup files, but bigger backup files tend to have more data that can be deduplicated on the cloud tier storage system, the 13 GB backup file with 12 GB of deduplicated data has the highest priority value of 14.16, while the 8 GB backup file with 2 GB of deduplicated data has the lowest priority value of 3.84.

The priority modules map the calculated priority values for each backup file to a pre-determined range so that the priority value can span across different priority orders as a backup file's priority order adapts based on system requirements. For example, the 8 GB backup file with 2 GB of deduplicated data has the highest priority value of 1.92 under normal conditions, the highest priority value of 15.38 when the active tier local storage system is below its storage threshold, and the lowest priority value of 3.84 when the cloud tier storage system is below its storage threshold. Similarly, the 13 GB backup file with 12 GB of deduplicated data has the lowest priority value of 1.18 under normal conditions, the lowest priority value of 1.57 when the active tier local storage system is below its storage threshold, and the highest priority value of 14.16 when the cloud tier storage system is below its storage threshold. When both the active tier local storage system and the cloud tier storage system are below their storage thresholds, the calculated priority values for the backup files would be similar to the calculated copying priority values under normal conditions because the equations terms in the numerator for high amounts of data deduplication and the equations terms in the denominator for low amounts of data deduplication would tend to cancel each other's effects out.

The priority modules enable end-users and backup applications to create custom priority orders based on backup file attributes, system attributes, and estimations based on heuristics. The priority modules even enable an end user or an application to set the highest priority value possible for a backup file, thus providing a way to set a priority which cannot be captured with pre-determined parameters or factors. A user-defined priority value or priority overrides any system-defined priority value or priority and any adaptive recalibration of a priority value or priority is disabled as long as a user-defined priority value or priority is set. The migration sub-system with priority modules enables an end-user to gain a finer control by overriding the default order of migration of backup files as required, thus enabling an end-user to create a custom priority order as per their needs. By enabling the overriding of priority values and/or priorities, the priority modules enable an end-user or backup application to explicitly define any priority value and/or priority, which is a capability that is absent in traditional migration systems.

Figure 7:
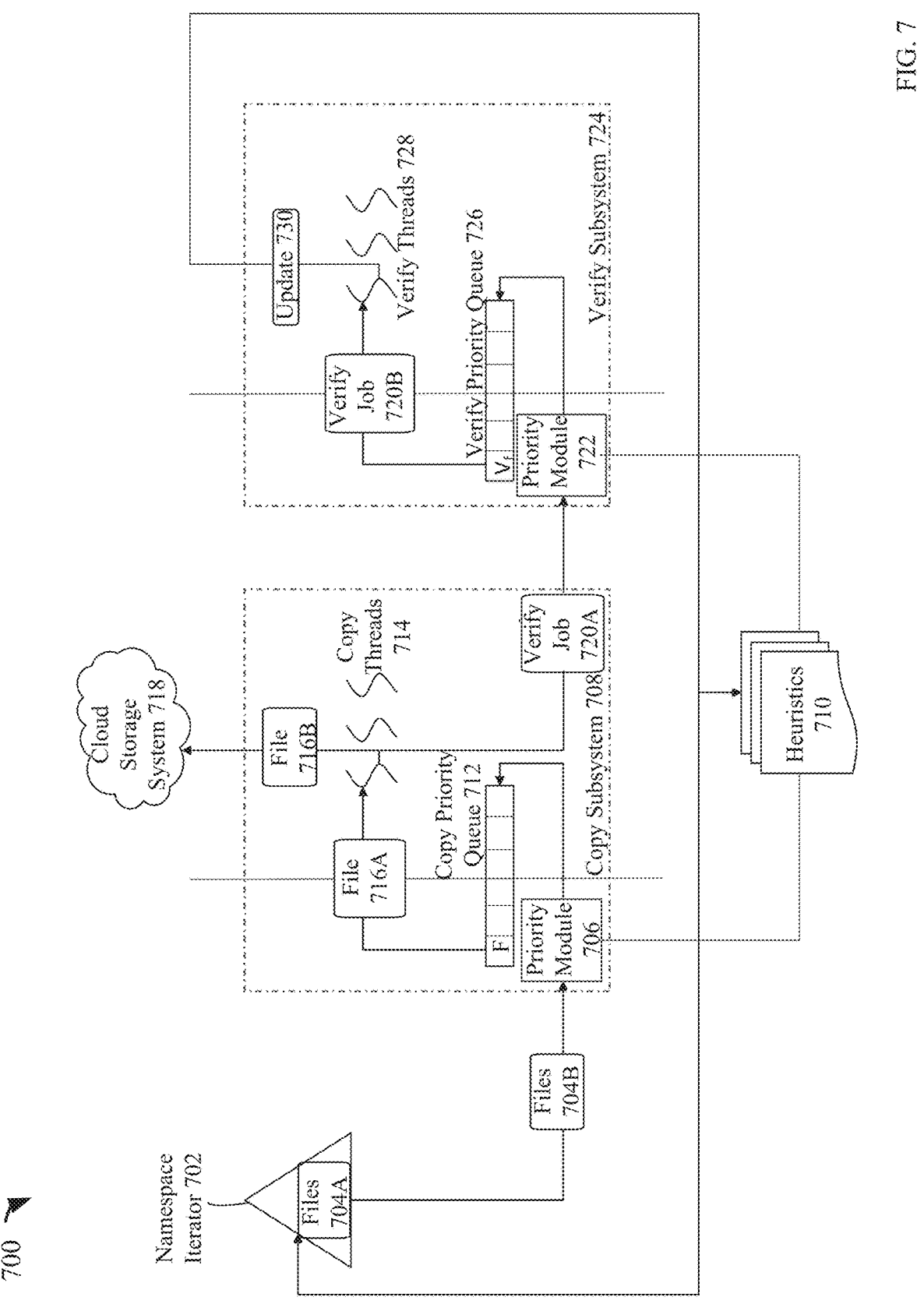
FIG. 7 illustrates a block diagram of an example heuristics-based prioritization in cloud migration for deduplication systems, under an embodiment.

FIG. 7 illustrates a block diagram 700 of an example heuristics-based prioritization in cloud migration for deduplication systems, under an embodiment. For example, FIG. 7 depicts that a namespace iterator 702 uses a policy to identify a set of backup files 704A that is eligible for migration, and sends the set of backup files 704A to a priority module 706, in the copy sub-system 708, which uses heuristics 710 to determine the copy priority values for the set of backup files 704B, and enqueues the set of backup files 704B into a copy priority queue 712 in the copy sub-system 708 in an order that is based on the copy priority values for the set of backup files 704B. Next, one of the copy threads 714 in the copy sub-system 708 retrieves a backup file 716A of the backup files 704B from the copy priority queue 712, in an order that is based on the copy priority values, stores a copy of the backup file 716B to a cloud tier storage system 718, and sends a metadata verify job 720A for the backup file 716B to the priority module 722 in a verify sub-system 724. The priority module 722 uses the heuristics 710 to determine the verify priority value for the metadata verify job 720A, and enqueues the metadata verify job 720A into a verify priority queue 726 in the verify sub-system 724 in an order that is based on the verify priority value for the metadata verify job 720A. Then one of the verify threads 728 in the verify sub-system 724 retrieves the metadata verify job 720B from the verify priority queue 726 in an order that is based on the verify priority values, and verifies metadata integrity for the backup file 716B, initiates an update 730 which updates the heuristics 710 about the backup file 716B, and updates the namespace 702 with the location of the backup file 716B as the cloud tier storage system 718.

For a secondary storage system with multi-streaming optimization for migration of backup files, the system marks relatively large backup files as multiple regions which are then processed in parallel. For a secondary storage data-protection system, data-invulnerability is of paramount importance, and for that reason the metadata integrity of the copied backup file is verified. Since a multi-streamed optimization system copies backup files at a region level, the subsequent verification of metadata is also performed at the region level, and then the region level metadata of all regions of a backup file are stitched together to synthesize the whole backup file together.

Consequently, this stitching together of a backup file's regions creates a change in the backup file's verified metadata, such that this change in the metadata requires re-verification for the new metadata in the newly stitched backup file. In the absence of a prioritization mechanism for a verification sub-system, a stitched backup file verification job that is enqueued in a verification priority queue can starve behind other region verifying jobs of other backup files, even though the verification time for a stitched backup file requires relatively small amounts of time because all of the backup file's region-level metadata have already been verified. For such situations, the priority modules enable the verification sub-system to execute a stitched backup file job before executing other verify jobs, which is not possible with traditional verification sub-system due to the absence of any provision to define priority in the verification sub-system.

For example, after verifying the metadata integrity for the last remaining region of the backup file 716B to have its metadata integrity verified, the verify thread that verified the metadata integrity for the last remaining region of the backup file 716B initiates a backup file synthesis that stitches the backup file's regions together to form a new segment tree. Without a priority mechanism, the verify sub-system 724 would have received the metadata verify job 720A and then appended the metadata verify job 720A at the end of the verify priority queue 726 to verify the metadata integrity for the metadata verify job 720A for the stitched backup file 716B. In contrast, the priority module 722 enables the verify thread that verified the metadata integrity for this remaining region of the backup file 716B to send the metadata verify job 720A for the stitched backup file 716B to the priority module 722 in the verify sub-system 724.

The priority module 722 uses the heuristics 710 to determine the verify priority value for the metadata verify job 720A for the stitched backup file 716B, wherein the verify threads 728 use this determined verify priority to prioritize the stitched backup file verify job over every other verify job for a non-stitched backup file. Consequently, the priority module 722 for the verify sub-system 724 defines the verify priority as the maximum possible value so that stitched backup files that are near migration completion can complete migration sooner. Since the requirement is only for the verify sub-system 724, the verify priority is defined only for the verify sub-system 724. All prioritized stitched backup file verify jobs will be served on first-come-first-serve basis.

$$P(f) = C$$

Next, the priority module 722 enqueues the metadata verify job 720A into the verify priority queue 726 in the verify sub-system 724 in an order that is based on the maximum possible verify priority for the metadata verify job 720A. Then one of the verify threads 728 in the verify sub-system 724 uses the maximum possible verify priority to retrieve the metadata verify job 720B before retrieving any other verify job for a non-stitched backup file from the verify priority queue 726, verifies the metadata integrity for the backup file 716B, and initiates an update 730 which updates the heuristics 710 about the backup file 716B, and updates the namespace 702 with the location of the backup file 716B as the cloud tier storage system 718. If the metadata verify job 720B is unable to verify the metadata integrity for the backup file 716B, then one of the verify threads 728 can execute the metadata verify job 720B again or send a message to a system administrator who can take corrective action and then notify the verify sub-system 724 to retry the verification of the metadata integrity for the backup file 716B.

The priority modules dynamically adapt to changes in system configuration and requirements, recalibrating the priority function accordingly. The priority modules start with a default configuration to prioritize backup files with relatively low estimated migration times, and then responds to certain triggers, such as an active tier local storage system or a cloud tier storage system falling below a space availability threshold. The system responds by changing the priority function to optimize migration as per the trigger requirement. The priority order amongst trigger requirements can also be specified, otherwise priority is defined as per last-come-first-serve basis.

The priority modules ensure that the priority value is mapped to same range for a backup file, so that the dynamic change in priority function may be facilitated. The priority function factors-in deduplication, which better equips the priority function for deduplication systems, while the provision of changing the priority function enables the priority function to be adapted for any type of migration. The dynamic and adaptive nature of the system is a unique optimization which recalibrates priority as per system requirements.

Figure 8:
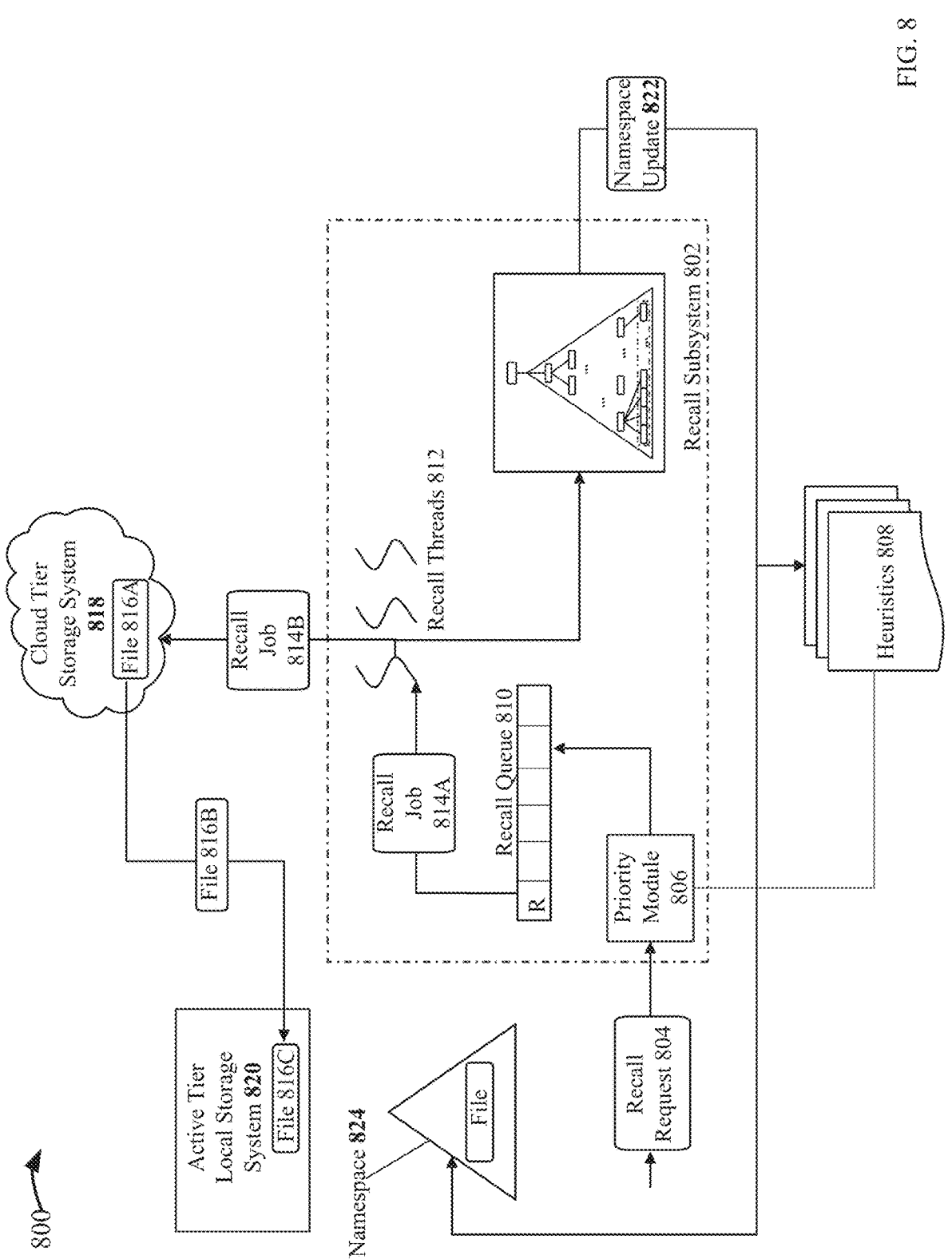
FIG. 8 illustrates a block diagram of an example heuristics-based prioritization for recall from a cloud tier storage system, for prioritization in cloud migration for deduplication systems, under an embodiment.

The restore use case differs from that of migrating backup files to the cloud tier storage system, and typically requires recalling one to a few backup files back from the cloud tier storage system to the active tier local storage system on an urgent basis. A recall request at a directory level results in recalling all the backup files stored to the cloud tier storage system from the directory, which may be optimized by the priority modules prioritizing backup files which are required with the highest urgency. By default, the estimated migration time is used to define the recall priority value for a backup file, which determines the recall priority for the backup file. FIG. 8 illustrates a block diagram 800 of an example heuristics-based prioritization for recall, for prioritization in cloud migration for deduplication systems, under an embodiment.

A recall sub-system 802 receives a set of recall requests 804 for a set of backup files through a priority module 806, in a recall sub-system 802, which uses heuristics 808 to determine a set of recall priority values corresponding to a set of backup files, and inserts a set of recall jobs for the set of backup files into a recall queue 810 in the order determined by the corresponding set of recall priority values. In a priority order established by the set of recall priority values, a recall thread of the multiple recall threads 812 retrieves one recall job 814A from the recall queue 810, and uses the recall job 814B to identify the corresponding backup file 816A in the cloud tier storage system 818, and migrates the backup file 816B to be stored as the backup file 816C in the active tier local storage system 820. The same recall thread initiates the metadata verification for the backup file 816A, which creates a namespace update 822, for the backup file 816A, which updates the heuristics 808 for the backup file 816A, and updates the backup file attributes in the namespace 824 to reflect the location of the backup file 816D as the active tier local storage system 820.

Secondary storage data-protection systems which extend the advantages of deduplication when using cloud tier storage system have not employed any prioritization mechanism. Consequently, these systems have suffered from a migration completion distribution that is negatively skewed for certain workloads, such as backup files, thus missing a better user experience opportunity. Therefore, the priority modules employ a heuristics-based prioritization mechanism which enhances the user experience without any negative impact on migration performance.

Figure 9:
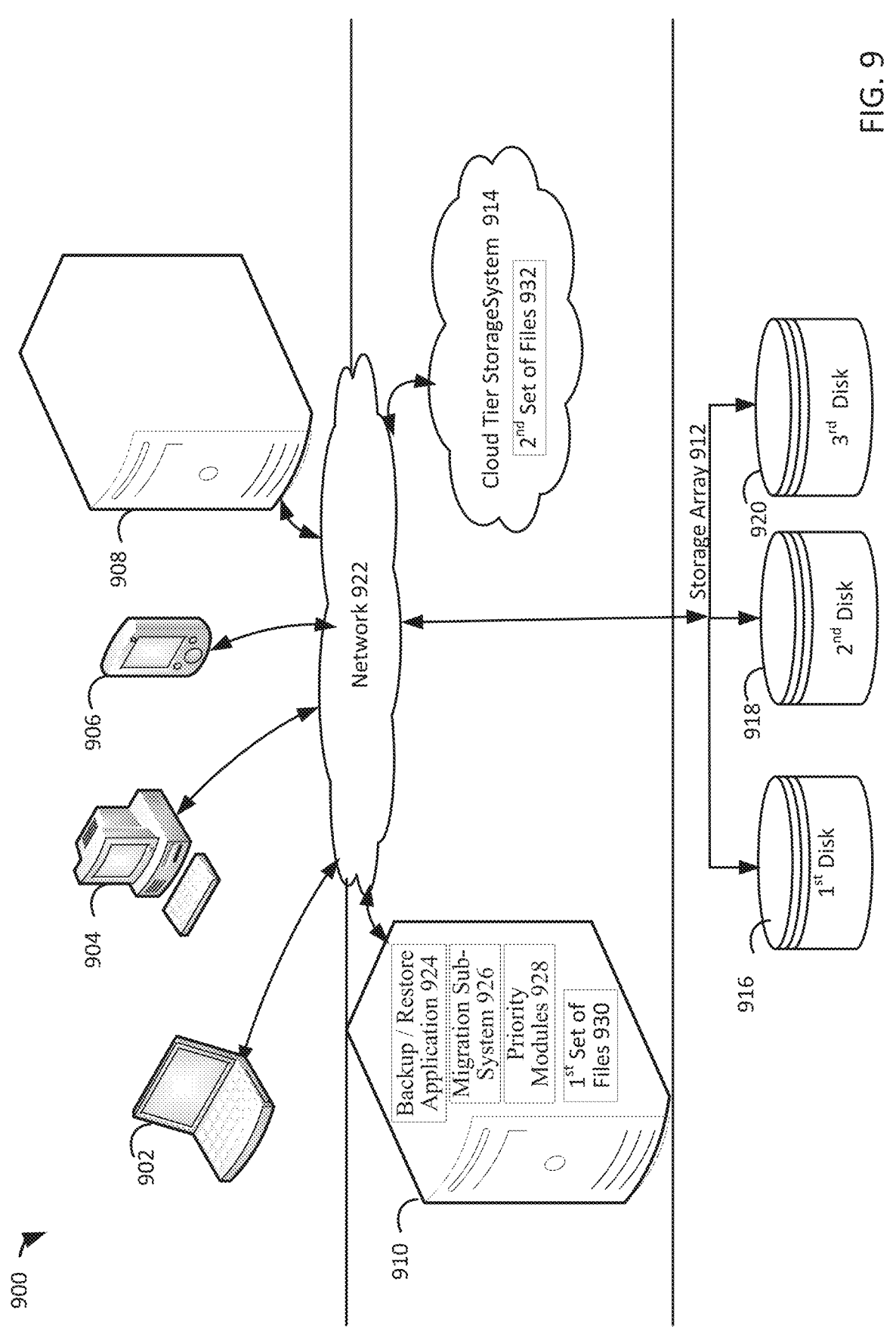
FIG. 9 illustrates a block diagram of an example system for prioritization in cloud migration for deduplication systems, under an embodiment.

FIG. 9 illustrates a diagram of a system 900 for prioritization in cloud migration for deduplication systems, under an embodiment. As shown in FIG. 9, the system 900 may illustrate a cloud computing environment in which data, applications, services, and other application resources are stored and delivered through shared data centers and appear as a single point of access for the users. The system 900 may also represent any other type of distributed computer network environment in which servers control the storage and distribution of application resources and services for different client users.

In an embodiment, the system 900 represents a cloud computing system that includes a first client 902, a second client 904, a third client 906, a fourth client 908, and a server 910, a storage array 912, and a cloud tier storage system 914 that may be provided by a hosting company. The storage array 912 may include a first disk 916, a second disk 918, and a third disk 920. The clients 902-908, the server 910, the storage array 912, and the cloud tier storage system 914 communicate via a network 922. The server 910 can include a backup/restore application 924, a migration sub-system 926, priority modules 928, and a first set of backup files 930, while the cloud tier storage system 914 can include a second set of backup files 932.

FIG. 9 depicts the system 900 with four clients 902-908, one server 910, one storage array 912, one cloud tier storage system 914, three disks 916-920, one network 922, one backup/restore application 924, one migration sub-system 926, one set of priority modules 928, and two sets of backup files 930-932. However, the system 900 may include any number of clients 902-908, any number of servers 910, any number of storage arrays 912, any number of cloud tier storage systems 914, any number of disks 916-920, any number of networks 922, any number of backup/restore applications 924, any number of migration sub-systems 926, any number of sets of priority modules 928, and any number of sets of backup files 930-932. The clients 902-908 and the server 910, may each be substantially similar to the system 1100 depicted in FIG. 11 and described below.

Although FIG. 9 depicts the first client 902 as a laptop computer 902, the second client 904 as a personal computer 904, the third client 906 as a smartphone 906, and the fourth client 908 as a server 908, each of the clients 902-908 may be any type of computer. Although FIG. 9 depicts the backup/restore application 924, the migration sub-system 926, the priority modules 928, and the first set of backup files 930 residing on the server 910, any combination of the backup/restore application 924, the migration sub-system 926, the priority modules 928, and the first set of backup files 930 may reside partially on the server 910 and partially on the clients 902-908, and partially on another server, or completely on another server, which is not depicted by FIG. 9. Furthermore, the sets of backup files 930-932 may be any type of data objects.

The server 910, which may be referred to as a backup server 910 or an active tier local storage system 910, can include the backup/restore application 924 that creates backup files of data objects for the clients 902-908, and can perform a restore operation based on the backup files stored on the storage array 912. The backup/restore application 924 provides centralized administration, such as scheduling, monitoring, and managing backup operations and backup files. The backup/restore application 924 enables the storing of backup operation schedules, client policies, and client configurations. The backup/restore application 924 provides a unique interface to the clients 902-908 during login and assists the server 910 in authenticating and registering the clients 902-908.

The backup/restore application 924 can send backup/restore work orders to the clients 902-908, which may receive and process the work orders to start a backup or restore operation. The backup/restore application 924 can maintain a local database of all processes that execute on the backup server 910. The backup/restore application 924 may execute server-side processes for a system administrator's graphical management console, which may enable the system administrator to use command line interface tools for queries. For example, a system administrator identifies the clients 902-908 registered with the backup server 910.

Although the following paragraphs describe Dell Corporation's PowerProtect® backup/restore application, Dell Corporation's Net Worker® backup/restore application, and Dell Corporation's Avamar® backup/restore application as examples of the backup/restore application 924, the backup/restore application 924 may be any other type of backup/restore application which provides the backup/restore functionalities described in the Background section. The backup server 910 may be any other type of backup server which provides the backup/restore functionalities described in the Background section.

The backup/restore application 924 may be a Dell Corporation's PowerProtect® Data Manager backup/restore application, which supports Microsoft SQL/Exchange/DB2/Oracle/SAP Oracle/SAP HANA/Backup filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage systems for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 924 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The Net Worker® management console software provides a graphic user interface for functions such as client configuration, policy settings, schedules, monitoring, reports, and daily operations for deduplicated and non-deduplicated backups.

The core NetWorker® software backs up client backup file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 924 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The system 900 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk for 6 months, store a primary clone of the backup copies onto the second disk for 1 year, and store a secondary clone of the backup copies onto a tape, which is not depicted in FIG. 9, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored, such as the storage array 912.

FIG. 10 is a flowchart that illustrates a method for prioritization in cloud migration for deduplication systems, under an embodiment. Flowchart 1000 depicts method acts illustrated as flowchart blocks for certain steps involved in the clients 902-908, the active tier local storage system (server) 910, the storage array 912, the cloud tier storage system 914, and/or the network 922, of FIG. 9.

A set of backup files can be identified as eligible for migration to a cloud storage system, by applying a migration eligibility policy to each backup file in a local storage system, block 1002. The migration eligibility policy may be based on a backup file, in the set of backup files, which corresponds to an age that is older than a specified threshold, which corresponds to an age that is within a specified age range, or that is marked as eligible for migration by an application. A system identifies backup files to be migrated to the cloud. For example, and without limitation, this can include the migration sub-system 926 identifying a CRM system's backup files that were created more than one month ago as backup files to be migrated from an active tier local storage system to a cloud tier storage system for long-term retention.

A set can be a collection of distinct entities that are regarded as a unit and that satisfy specific conditions. A backup file can be a copy of computer data taken and then stored elsewhere so that it may be used to restore the original computer data. Eligible can be the satisfying of specific conditions. Migration can be movement from one location to another location. A cloud storage system can be a model of computer data retention in which digital data is retained in logical pools. A migration eligibility policy can be a strategy for identifying entities that satisfy the specific conditions for movement from one location to another location. An age can be the length of time that an entity has existed. An age range can be the area of variation between upper and lower limits for the length of time that an entity has existed.

After identifying a set of backup files to be migrated to a cloud storage system, a set of priorities is created which correspond to backup files in the set of backup files, wherein each priority is based on estimating a time required for a corresponding backup file to migrate from a local storage system to a cloud storage system and/or an amount of data deduplicated when the corresponding backup file is stored, block 1004. The estimated time required for a backup file to migrate from an active tier local storage system to a cloud tier storage system may be based on a backup file size, a locality of backup file data, an eligibility for multi-streaming, and/or an eligibility for recipe-based optimization. The system creates priorities for copying backup files to the cloud. By way of example and without limitation, this can include the migration sub-system 926 creating a set of copying priorities for the CRM records' backup files which were created more than a month ago, with the copying priorities based on estimating the time required for a corresponding CRM record's backup file to migrate from the active tier local storage system 910 to the cloud tier storage system 914 and/or the amount of data deduplicated when the corresponding CRM record's backup file is stored.

A priority can be a right for an entity to take precedence or to proceed before other entities. A local storage system can be an apparatus that retains retrievable data for a computer and that can be accessed without the use of a network. A backup file size can be a magnitude of a copy of computer data. A locality can be the number of areas where parts of a unit of information are distributed.

Backup file data can be the information stored by a computer's memory or storage device under a single identifying name. An eligibility can be the satisfying of specific conditions. Multi-streaming can be a method of transmitting or receiving data over a computer network as more than one steady and continuous flow. Recipe-based optimization can be a set of instructions for making the best or most effective use of a resource. A total amount can be the whole quantity of some entities. Data deduplication can be the elimination of redundant information. Time can be a chronological measure, such as in hours and minutes, related to an event occurring.

Following the creation of a set of priorities for copying a set of backup files to a cloud storage system, a backup file, which corresponds to the highest priority in a set of priorities, is copied from the set of backup files stored in a local storage system to the cloud storage system, block 1006. The system uses the priorities to begin copying backup files to the cloud. In embodiments, this can include the migration sub-system 926 copying a CRM backup file that stores 8 GB of data, including 2 GB of data that was previously deduplicated, and that currently has the highest copying priority of 1.92 among the set of the CRM backup files, to the cloud tier storage system 718. A highest priority can be the greatest magnitude, relative to other magnitudes of other entities, of the right for an entity to take precedence or to proceed before the other entities.

To complete the copying of a set of backup files to a cloud storage system, a backup file, which corresponds to the lowest priority in a set of priorities, is copied from the set of backup files stored in a local storage system to the cloud storage system, block 1008. The system uses the priorities to complete the copying of the backup files to the cloud. For example, and without limitation, this can include the migration sub-system 926 copying the CRM backup file that stores 13 GB of data, including 12 GB of data that was previously deduplicated, and that currently has the lowest copying priority of 1.18 among the set of the CRM backup files, to the cloud tier storage system 718, thereby completing the copying of the set of CRM backup files to the cloud tier storage system 718. A lowest priority can be the least magnitude, relative to other magnitudes of other entities, of the right for an entity to take precedence or to proceed before the other entities.

Having created copying priorities for copying backup files to the cloud, the migration sub-system 926 can also create a second set of priorities which correspond to backup files in the set of backup files, wherein the second set of priorities are based on a type of backup file that is in the set of backup files, block 1010. The system may create priorities for verifying the integrity of copied backup files' metadata. By way of example and without limitation, this can include the migration sub-system 926 creating a set of verifying priorities for the set of CRM backup files, with the set of verifying priorities based on each stitched CRM backup file being assigned the highest verifying priority. A type can be a category of entities having common characteristics.

After creating the priorities for verifying the integrity of a backup file's metadata, the verifying can begin with verifying the integrity of the metadata associated with the backup file which corresponds to the highest priority in the second set of priorities, block 1012. The system may use priorities for beginning the verifying of the metadata integrity of backup files which were copied to the cloud. In embodiments, this can include the migration sub-system 926 verifying the integrity of the metadata for the stitched CRM backup file before verifying the integrity of the metadata for the non-stitched CRM backup files. Integrity can be the state of being whole and undivided. Metadata can be information about the information stored by a computer's memory or storage device under a single identifying name.

Subsequent to verifying the integrity of the metadata for the backup file which has the highest verifying priority, the integrity can be verified of metadata associated with a backup file which corresponds to the lowest priority in the second set of priorities, block 1014. The system may complete using priorities for verifying the metadata integrity of backup files copied to the cloud. For example, and without limitation, this can include the migration sub-system 926 verifying the integrity of the CRM backup file's metadata that has the lowest verifying priority, having already verified the integrity of the stitched CRM backup file's metadata that has the highest verifying priority.

In response to copying each backup file to the cloud and verifying the metadata integrity of each of the backup files, each location record corresponding to each backup file, of the set of backup files can be updated, block 1016. The system may update the namespace with records about migrating backup files to the cloud. By way of example and without limitation, this can include the migration sub-system 926 updating the namespace to record the copying of each CRM backup file to the cloud tier storage system 914 and the verifying of each CRM backup file's metadata integrity. A location record can be a number of related items of information, including a position or address in computer memory or storage, which are handled as a unit.

Prior to using a set of priorities to copy each backup file in a set of backup files from a local storage system to a cloud storage system, a space availability falls below a storage threshold for the local storage system and/or the cloud storage system, such that at least one priority in the set of priorities can be dynamically recalibrated, block 1018. The system may change the priorities for copying backup files from the active tier storage system to the cloud tier storage system when the available storage space falls too low for either storage system. In embodiments, this can include the migration sub-system 926 dynamically recalibrating the priorities for copying the CRM backup files to the cloud tier storage system because the cloud tier storage system' available storage space fell below a low storage threshold. The dynamic recalibration of the coping priority changes the priority for the CRM backup file that stores 13 GB of data, including 12 GB of data that was deduplicated, from the lowest copying priority of 1.18 to the highest copying priority value of 14.16, and changing the relative priority for the CRM backup file that stores 8 GB of data, including 2 GB of data that was deduplicated from the highest copying priority of 1.92 to the lowest copying priority of 3.84. Space availability can be the magnitude of a currently unused amount that an entity can contain. A storage threshold can be the magnitude of a currently unused amount that an entity can contain for a certain result or condition to occur or be manifested. A copy can be a duplicate of an entity.

Having migrated backup files from a local storage system to a cloud storage system, a third set of priorities can be created which correspond to backup files in another set of backup files, wherein the third set of priorities are based on an estimated time required for a corresponding backup file to migrate from the cloud storage system to the local storage system, block 1020. The system may create recalling priorities for recalling backup files from the cloud. For example, and without limitation, this can include the migration sub-system 926 creating a set of recall priorities for the set of CRM backup files, creating the highest recall priority of 1.92 for the CRM backup file that stores 8 GB of data, including 2 GB of data that was previously deduplicated, and creating the lowest recall priority of 1.18 for the CRM backup file that stores 13 GB of data, including 12 GB of data that was previously deduplicated. A recall can be a request to restore stored computer data for processing. An estimated time can be an approximate calculation of a chronological measure, such as in hours and minutes, related to an event occurring.

After creating priorities for recalling backup files, a backup file, of another set of backup files, can be recalled, and correspond to the highest priority of the third set of priorities, from a cloud storage system to a local storage system, block 1022. The system may begin recalling the backup files that have the quickest recall times and therefore have the highest recalling priorities. By way of example and without limitation, this can include the migration sub-system 926 recalling the CRM backup file that stores 8 GB of data, including 2 GB of data that was deduplicated, which has the highest recall priority of 1.92 among the set of the CRM backup files Following the recall of the backup file with the highest recalling priority, a backup file, of another set of backup files, can be recalled, and correspond to a lowest priority of the third set of priorities, from a cloud storage system to a local storage system, thereby completing a recalling of the other set of backup files from the cloud storage system to the local storage system, block 1024. The system may complete the use of the recalling priority to recall the backup files. In embodiments, this can include the migration sub-system 926 recalling the CRM backup file that stores 13 GB of data, including 12 GB of data that was previously deduplicated, which has the lowest recall priority of 1.18, having already recalled the CRM backup files which have the other recalling priorities.

Although FIG. 10 depicts the blocks 1002-1024 occurring in a specific order, the blocks 1002-1024 may occur in another order. In other implementations, each of the blocks 1002-1024 may also be executed in combination with other blocks and/or some blocks may be divided into a different set of blocks.

Figure 11:
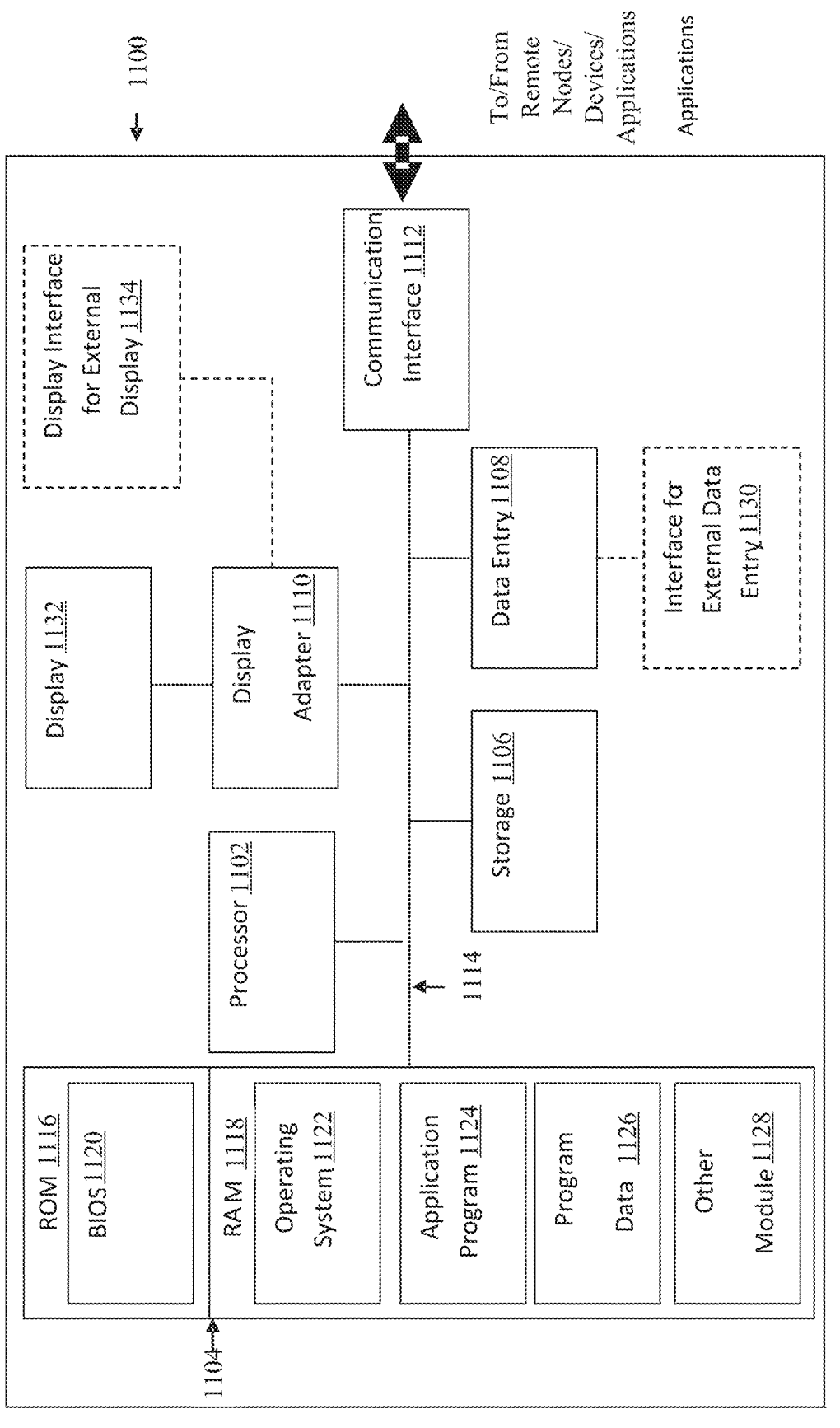
FIG. 11 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 11 may vary depending on the system implementation. With reference to FIG. 11, an exemplary system for implementing the subject matter disclosed herein includes a hardware device 1100, including a processing unit 1102, memory 1104, storage 1106, a data entry module 1108, a display adapter 1110, a communication interface 1111, and a bus 1114 that couples the elements 1104-1111 to the processing unit 1102.

The bus 1114 may comprise any type of bus architecture. Examples include a memory bus, a peripheral bus, a local bus, etc. The processing unit 1102 is an instruction execution machine, apparatus, or device and may comprise a microprocessor, a digital signal processor, a graphics processing unit, an application specific integrated circuit (ASIC), a field programmable gate array (FPGA), etc. The processing unit 1102 may be configured to execute program instructions stored in the memory 1104 and/or the storage 1106 and/or received via the data entry module 1108.

The memory 1104 may include read only memory (ROM) 1116 and random-access memory (RAM) 1118. The memory 1104 may be configured to store program instructions and data during operation of the hardware device 1100. In various embodiments, the memory 1104 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 1104 may also include nonvolatile memory technologies such as nonvolatile flash RAM (NVRAM) or ROM. In some embodiments, it is contemplated that the memory 1104 may include a combination of technologies such as the foregoing, as well as other technologies not specifically mentioned. When the subject matter is implemented in a computer system, a basic input/output system (BIOS) 1120, containing the basic routines that help to transfer information between elements within the computer system, such as during start-up, is stored in the ROM 1116.

The storage 1106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 1100. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 1106, the ROM 1116 or the RAM 1118, including an operating system 1122, one or more applications programs 1124, program data 1126, and other program modules 1128. A user may enter commands and information into the hardware device 1100 through the data entry module 1108. The data entry module 1108 may include mechanisms such as a keyboard, a touch screen, a pointing device, etc. Other external input devices (not shown) are connected to the hardware device 1100 via an external data entry interface 1130.

By way of example and not limitation, external input devices may include a microphone, joystick, game pad, satellite dish, scanner, or the like. In some embodiments, external input devices may include video or audio input devices such as a video camera, a still camera, etc. The data entry module 1108 may be configured to receive input from one or more users of the hardware device 1100 and to deliver such input to the processing unit 1102 and/or the memory 1104 via the bus 1114.

A display 1132 is also connected to the bus 1114 via the display adapter 1110. The display 1132 may be configured to display output of the hardware device 1100 to one or more users. In some embodiments, a given device such as a touch screen, for example, may function as both the data entry module 1108 and the display 1132. External display devices may also be connected to the bus 1114 via an external display interface 1134. Other peripheral output devices, not shown, such as speakers and printers, may be connected to the hardware device 1100.

The hardware device 1100 may operate in a networked environment using logical connections to one or more remote nodes (not shown) via the communication interface 1111. The remote node may be another computer, a server, a router, a peer device, or other common network node, and typically includes many or all the elements described above relative to the hardware device 1100. The communication interface 1111 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1111 may include logic configured to support direct memory access (DMA) transfers between the memory 1104 and other devices.

In a networked environment, program modules depicted relative to the hardware device 1100, or portions thereof, may be stored in a remote storage device, such as, for example, on a server. It will be appreciated that other hardware and/or software to establish a communications link between the hardware device 1100 and other devices may be used.

The arrangement of the hardware device 1100 illustrated in FIG. 11 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 11.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for prioritization in cloud migration for deduplication systems, comprising:

one or more processors; and a non-transitory computer readable medium storing a plurality of instructions, which when executed, cause the one or more processors to:

create a set of migration order priorities for backup files in a set of backup files, wherein the corresponding migration order priority of each backup file in the set of backup files is determined prior to migrating the set of backup files from a local storage system to a cloud storage system, and is: i) inversely proportional to an estimated migration time based on a weighted average of each time required for the corresponding backup files in the set of backup files to be migrated from the local storage system to the cloud storage system, and ii) directly proportional to an estimated amount of data based on a weighted average of each amount of data that was deduplicated when the corresponding backup files are stored; and migrate each backup file from the set of backup files stored in the local storage system to the cloud storage system based on the created set of migration order priorities, the migration commencing with the backup file in the set of backup files having a highest migration order priority in the set of migration order priorities and ending with the backup file in the set of backup files having a lowest migration order priority in the set of migration order priorities, thereby completing the migration of the set of backup files to the cloud storage system.

2. The system of claim 1, wherein creating the set of migration order priorities is in response to identifying the set of backup files as eligible for migration to the cloud storage system by applying a migration eligibility policy to each backup file in the local storage system.

3. The system of claim 2, wherein the migration eligibility policy is based on at least one of a backup file, in the set of backup files, which corresponds to an age that is older than a specified threshold, which corresponds to an age that is within a specified age range, or that is marked as eligible for migration by an application.

4. The system of claim 1, wherein each estimated time required for the corresponding backup files to migrate from the local storage system to the cloud storage system is based on at least one of a backup file size, a locality of backup file data, an eligibility for multi-streaming, and an eligibility for recipe-based optimization.

5. The system of claim 1, wherein the plurality of instructions, when executed, will further cause the one or more processors to:

create a second set of migration order priorities corresponding to backup files in the set of backup files, wherein the second set of migration order priorities is based on a type of backup file that is in the set of backup files;

verify integrity of metadata associated with a backup file which corresponds to a highest migration order priority in the second set of migration order priorities;

verify integrity of metadata associated with a backup file which corresponds to a lowest migration order priority in the second set of migration order priorities; and update each location record corresponding to each backup file of the set of backup files in response to copying each backup file of the set of backup files to the cloud storage system and verifying integrity of metadata associated with each backup file of the set of backup files.

6. The system of claim 1, wherein the plurality of instructions, when executed, will further cause the one or more processors to dynamically recalibrate at least one migration order priority in the set of migration order priorities, prior to copying each backup file in the set of backup files from the local storage system to the cloud storage system, in response to a space availability falling below a storage threshold for at least one of the local storage system or the cloud storage system.

7. The system of claim 1, wherein the plurality of instructions, when executed, will further cause the one or more processors to:

create a third set of migration order priorities corresponding to backup files in another set of backup files, wherein the third set of migration order priorities are based on an estimated time required for a corresponding backup file to migrate from the cloud storage system to the local storage system;

recall a backup file, of the other set of backup files, which corresponds to a highest migration order priority of the third set of migration order priorities, from the cloud storage system to the local storage system; and recall a backup file, of the other set of backup files, which corresponds to a lowest migration order priority of the third set of migration order priorities, from the cloud storage system to the local storage system, thereby completing a recalling of the other set of backup files from the cloud storage system to the local storage system.

8. A computer-implemented method for prioritization in cloud migration for deduplication systems, comprising:

creating a set of migration order priorities for backup files in a set of backup files, wherein the corresponding migration order priority of each backup file in the set of backup files is determined prior to migrating the set of backup files from a local storage system to a cloud storage system, and is: i) inversely proportional to an estimated migration time based on a weighted average of each time required for the corresponding backup files in the set of backup files to be migrated from the local storage system to the cloud storage system, and ii) directly proportional to an estimated amount of data based on a weighted average of each amount of data that was deduplicated when the corresponding backup files are stored; and migrating each backup file from the set of backup files stored in the local storage system to the cloud storage system based on the created set of migration order priorities, the migration commencing with the backup file in the set of backup files having a highest migration order priority in the set of migration order priorities and ending with the backup file in the set of backup files having a lowest migration order priority in the set of migration order priorities, thereby completing the migration of the set of backup files to the cloud storage system.

9. The computer-implemented method of claim 8, wherein creating the set of migration order priorities is in response to identifying the set of backup files as eligible for migration to the cloud storage system by applying a migration eligibility policy to each backup file in the local storage system.

10. The computer-implemented method of claim 9, wherein the migration eligibility policy is based on at least one of a backup file, in the set of backup files, which corresponds to an age that is older than a specified threshold, which corresponds to an age that is within a specified age range, or that is marked as eligible for migration by an application.

11. The computer-implemented method of claim 8, wherein each estimated time required for the corresponding backup files to migrate from the local storage system to the cloud storage system is based on at least one of a backup file size, a locality of backup file data, an eligibility for multi-streaming, and an eligibility for recipe-based optimization.

12. The computer-implemented method of claim 8, wherein the method further comprises creating a second set of migration order priorities corresponding to backup files in the set of backup files, wherein the second set of migration order priorities is based on a type of backup file that is in the set of backup files;

verifying integrity of metadata associated with a backup file which corresponds to a highest migration order priority in the second set of migration order priorities;

verifying integrity of metadata associated with a backup file which corresponds to a lowest migration order priority in the second set of migration order priorities; and updating each location record corresponding to each backup file of the set of backup files in response to copying each backup file of the set of backup files to the cloud storage system and verifying integrity of metadata associated with each backup file of the set of backup files.

13. The computer-implemented method of claim 8, wherein the method further comprises dynamically recalibrating at least one migration order priority in the set of migration order priorities, prior to copying each backup file in the set of backup files from the local storage system to the cloud storage system, in response to a space availability falling below a storage threshold for at least one of the local storage system or the cloud storage system.

14. The computer-implemented method of claim 8, wherein the method further comprises creating a third set of migration order priorities corresponding to backup files in another set of backup files, wherein the third set of migration order priorities are based on an estimated time required for a corresponding backup file to migrate from the cloud storage system to the local storage system;

recalling a backup file, of the other set of backup files, which corresponds to a highest migration order priority of the third set of migration order priorities, from the cloud storage system to the local storage system; and recalling a backup file, of the other set of backup files, which corresponds to a lowest migration order priority of the third set of migration order priorities, from the cloud storage system to the local storage system, thereby completing a recalling of the other set of backup files from the cloud storage system to the local storage system.

15. A computer program product, comprising a non-transitory computer-readable medium having a computer-readable program code embodied therein to be executed by one or more processors, the program code including instructions to:

create a set of migration order priorities for backup files in a set of backup files, wherein the corresponding migration order priority of each backup file in the set of backup files is determined prior to migrating the set of backup files from a local storage system to a cloud storage system, and is: i) inversely proportional to an estimated migration time based on a weighted average of each time required for the corresponding backup files in the set of backup files to be migrated from the local storage system to the cloud storage system, and ii) directly proportional to an estimated amount of data based on a weighted average of each amount of data that was deduplicated when the corresponding backup files are stored; and migrate each backup file from the set of backup files stored in the local storage system to the cloud storage system based on the created set of migration priorities, the migration commencing with the backup file in the set of backup files having a highest priority in the set of migration priorities and ending with the backup file in the set of backup files having a lowest priority in the set of migration priorities, thereby completing the migration of the set of backup files to the cloud storage system.

16. The computer program product of claim 15, wherein creating the set of migration order priorities is in response to identifying the set of backup files as eligible for migration to the cloud storage system by applying a migration eligibility policy to each backup file in the local storage system, wherein the migration eligibility policy i based on at least one of a backup file, in the set of backup files, that corresponds to an age that is older than a specified threshold, that corresponds to an age that is within a specified age range, or that is marked as eligible for migration by an application.

17. The computer program product of claim 15, wherein each estimated time required for the corresponding backup files to migrate from the local storage system to the cloud storage system is based on at least one of a backup file size, a locality of backup file data, an eligibility for multi-streaming, and an eligibility for recipe-based optimization.

18. The computer program product of claim 15, wherein the program code includes further instructions to create a second set of priorities which correspond to backup files in the set of backup files, wherein the second set of priorities is based on a type of backup file that is in the set of backup files;

verify integrity of metadata associated with a backup file which corresponds to a highest priority in the second set of priorities;

verify integrity of metadata associated with a backup file which corresponds to a lowest priority in the second set of priorities; and update each location record corresponding to each backup file of the set of backup files in response to copying each backup file of the set of backup files to the cloud storage system and verifying integrity of metadata associated with each backup file of the set of backup files.

19. The computer program product of claim 15, wherein the program code includes further instructions to dynamically recalibrate at least one migration order priority in the set of migration order priorities, prior to copying each backup file in the set of backup files from the local storage system to the cloud storage system, in response to a space availability falling below a storage threshold for at least one of the local storage system or the cloud storage system.

20. The computer program product of claim 15, wherein the program code includes further instructions to:

create a third set of priorities which correspond to backup files in another set of backup files, wherein the third set of priorities are based on an estimated time required for a corresponding backup file to migrate from the cloud storage system to the local storage system;

recall a backup file, of the other set of backup files, which corresponds to a highest priority of the third set of priorities from the cloud storage system to the local storage system; and recall a backup file, of the other set of backup files, which corresponds to a lowest priority of the third set of priorities from the cloud storage system to the local storage system, thereby completing a recalling of the other set of backup files from the cloud storage system to the local storage system.

\* \* \* \* \*